Nov. 7, 1933.  N. A. MEARS ET AL  1,933,920
HOOD LATCH
Filed March 29, 1932  3 Sheets-Sheet 1
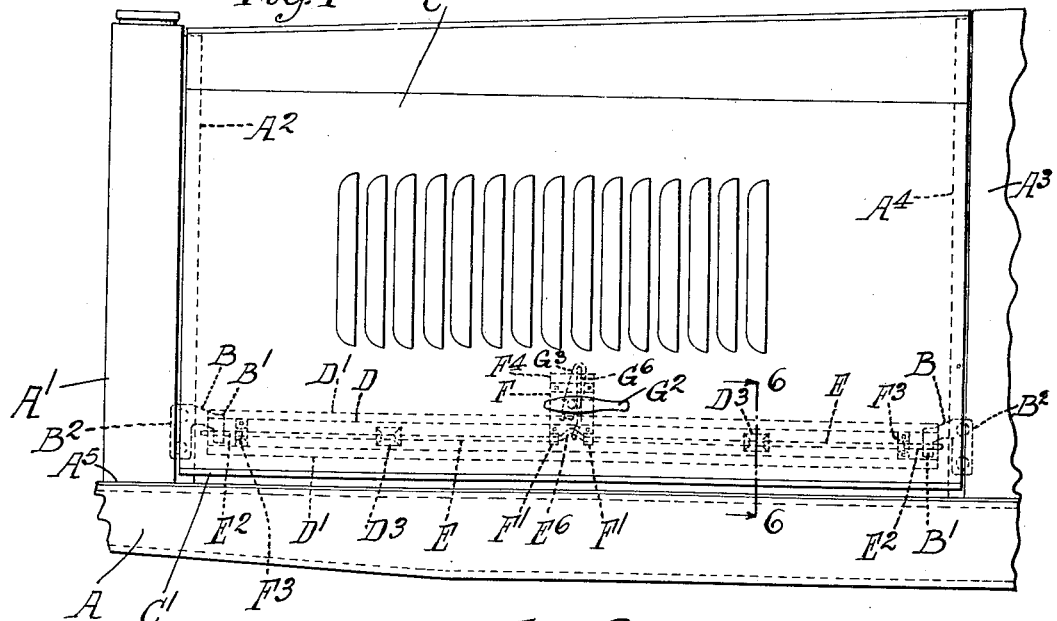
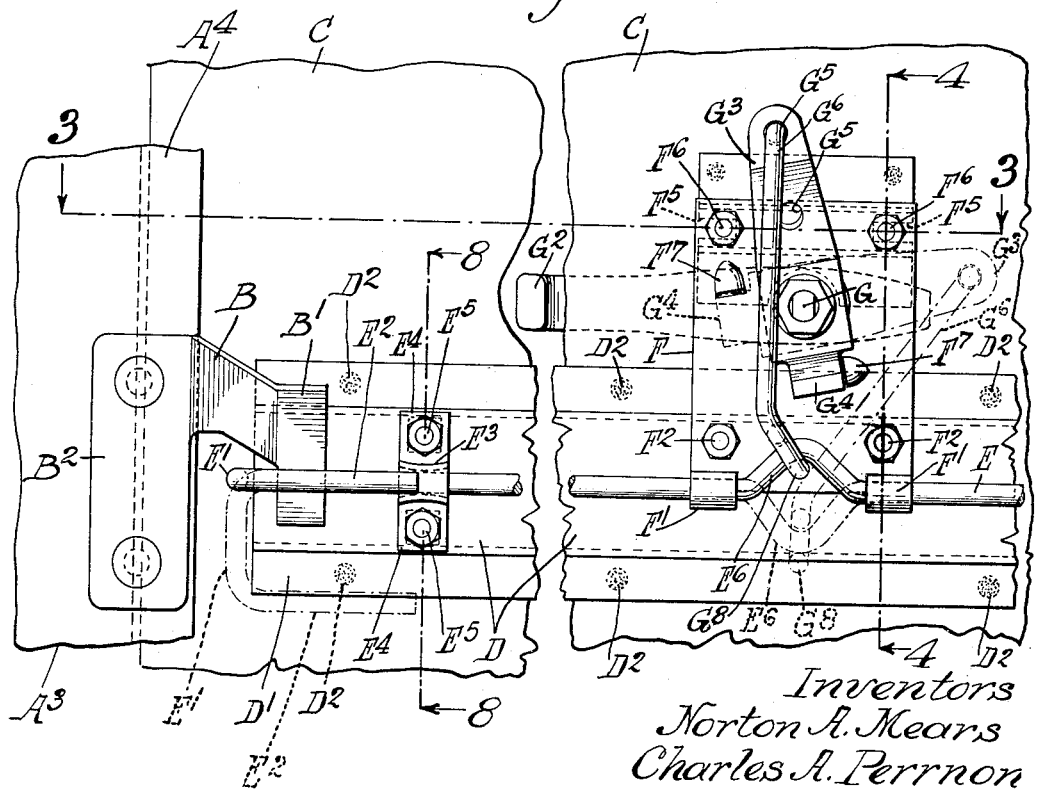
Inventors
Norton A. Mears
Charles A. Perrnon
by Parker & Carter
Attorneys.

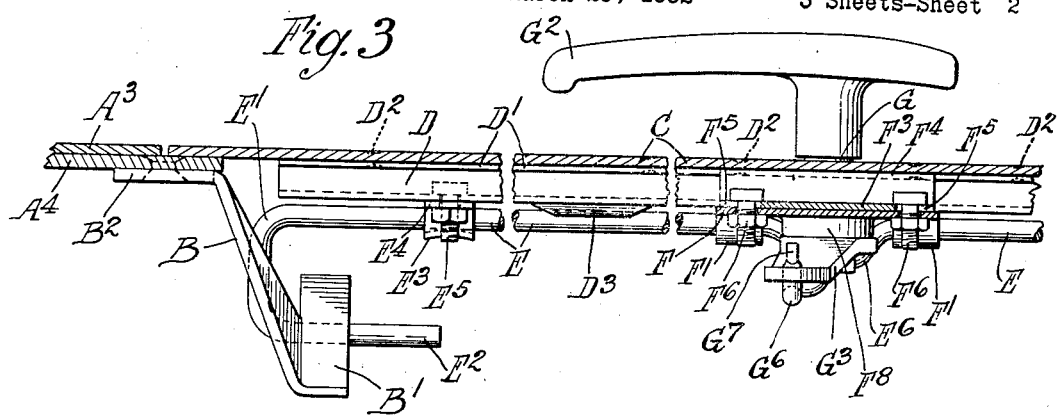
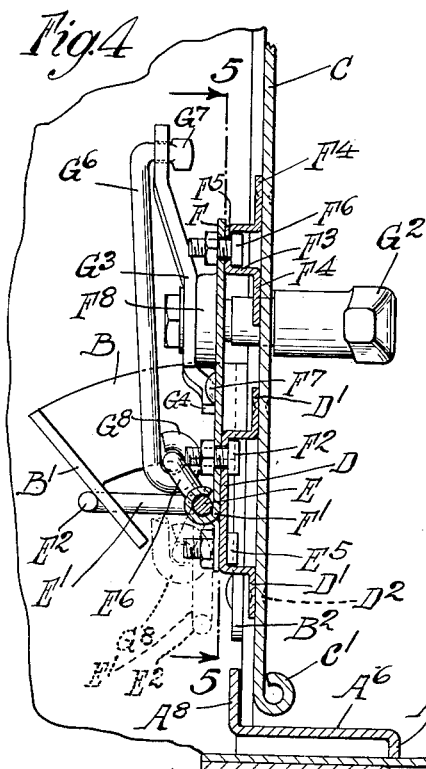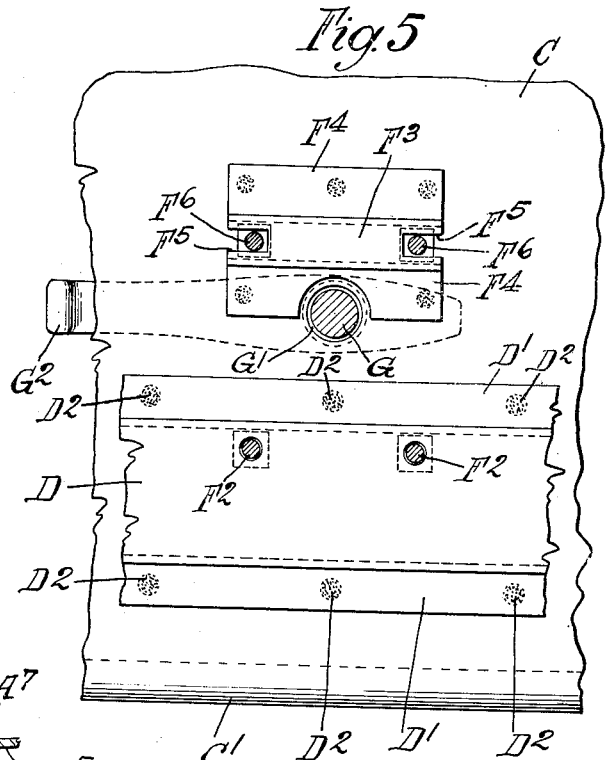
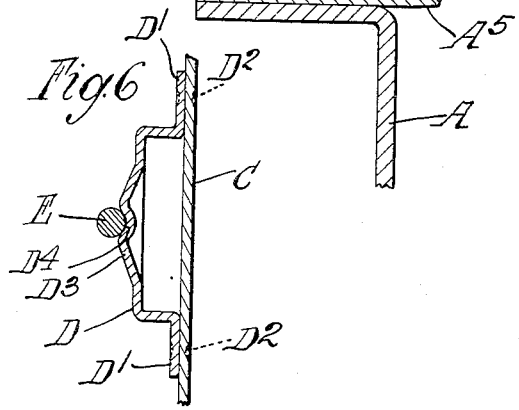

Nov. 7, 1933.   N. A. MEARS ET AL   1,933,920
HOOD LATCH
Filed March 29, 1932   3 Sheets-Sheet 3
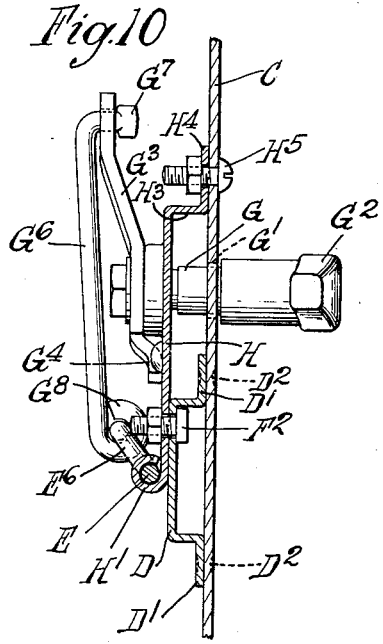
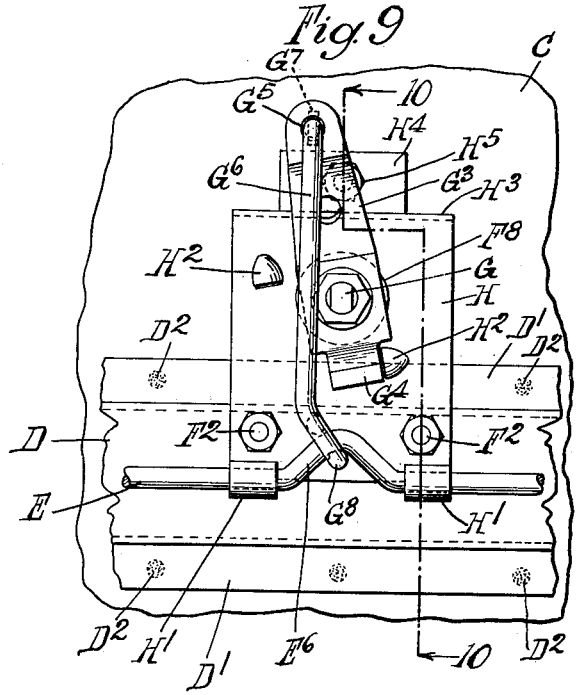
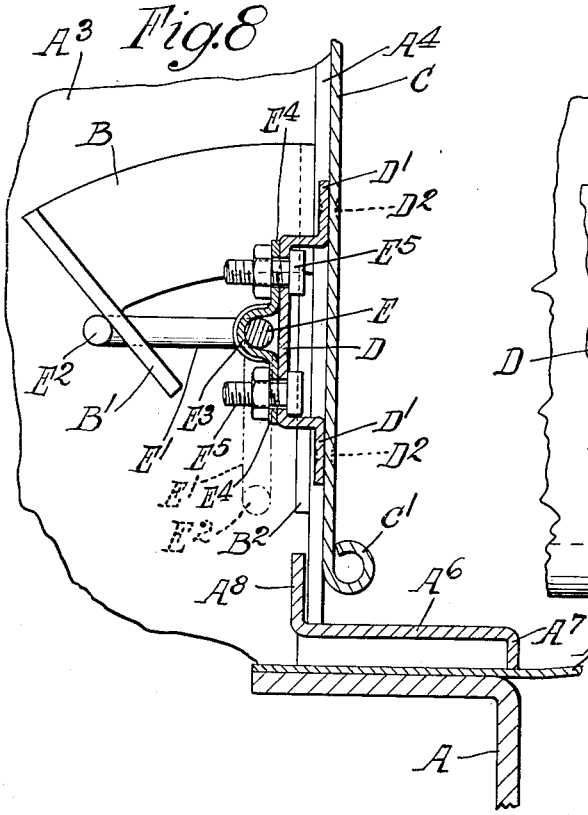
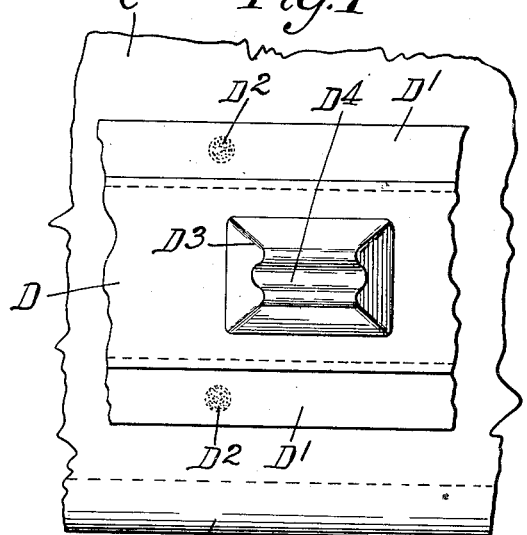
Inventors.
Norton A. Mears
Charles A. Perrnon
by Parker & Carter
Attorneys.

Patented Nov. 7, 1933

1,933,920

UNITED STATES PATENT OFFICE 1,933,920

HOOD LATCH

Norton A. Mears and Charles A. Perrnon, Chicago, Ill., assignors to Chicago Forging & Manufacturing Co., Chicago, Ill., a corporation of Illinois Application March 29, 1932. Serial No. 601,822

7 Claims. (Cl. 292—214)

This invention relates to a latching means for latching the closure of an automobile hood and while it may be used for other purposes, it is primarily concerned with the latching and holding in position of automobile hoods.

One object is to provide a latch of a type particularly adapted for use with relatively long hoods and the provision of means for preventing the bending and distortion of the hood.

Another object is to provide means in connection with a hood latching mechanism for stiffening the hood as a whole, irrespective of its length. Another object is to provide means in connection with a hood and hood latch to prevent or dampen vibration of the parts.

Other objects will appear from time to time in the specification and claims.

The invention is illustrated more or less diagrammatically in the accompanying drawings, wherein:—

Figure 1 is a fragmentary side elevation of an automobile showing a closed hood with the hood latching mechanism indicated in dotted lines;

Figure 2 is an inside fragmentary elevation on an enlarged scale with parts omitted and parts broken away, showing the latch in locking position and showing the latch operating mechanism;

Figure 3 is a generally horizontal cross sectional detail taken at line 3—3 of Figure 2, with parts omitted and parts broken away;

Figure 4 is a transverse vertical cross section taken at line 4—4 of Figure 2;

Figure 5 is a longitudinal vertical cross section taken at line 5—5 of Figure 4;

Figure 6 is a transverse vertical sectional detail taken at line 6—6 of Figure 1, on an enlarged scale, showing one form of vibration dampener;

Figure 7 is a detailed view showing the dampener of Figure 6 in elevation;

Figure 8 is a transverse vertical cross sectional detail taken at line 8—8 of Figure 2;

Figure 9 is a detailed inside view of the hood, showing a modified form of latch operating mechanism, differing somewhat from that similarly indicated at the right hand of Figure 2;

Figure 10 is a transverse vertical cross sectional detail of the latch operating mechanism shown in Figure 9.

Like parts are designated by like characters throughout the specification and drawings.

A indicates a portion of an automobile frame. $A^1$ is a radiator housing or shell which may have attached to it an inwardly bent or spaced flange or projecting member $A^2$. $A^3$ is a cowl having adjacent it or attached to it an inwardly bent flange or member $A^4$. $A^5$ is a portion of a fender which may or may not be present. $A^6$ is a strip which normally forms no part of the hood and is not contacted by the hood. It is usually present to prevent water blowing under the hood. It may have a downwardly bent flange $A^7$ along its outer edge and an upwardly bent flange $A^8$ along its inner edge. It does not ordinarily serve as an abutment for the hood.

Each of the members $A^2$ and $A^4$ carries a hook B having a downwardly facing arm as shown, and a further downward extension $B^1$ which may be at an angle to the arm B. The arm B is fastened to a flattened portion $B^2$ which may be welded, riveted or otherwise fastened to one of the members $A^2$ or $A^4$.

C is a hood or cover portion which may be of any suitable design and may be made of any desirable number of pieces. It may have along its lower edge a curved portion $C^1$ and may be hinged or fastened at its upper edge in any suitable fashion.

Along the hood member C and preferably adjacent its lower edge is mounted a stiffening and latch carrying member D. As shown, this member is preferably in the form of a channel provided with laterally extending flanges $D^1$ by means of which it is fastened to the hood. In the form shown it is welded as at $D^2$ although it may be fastened to the hood in any suitable manner. The channel portion D may have one or more vibration dampening portions fastened to it or formed in it. As shown in detail in Figures 6 and 7 these vibration dampening parts are raised members $D^3$ provided preferably with symmetrically inclined sides and ends as shown, and with a longitudinal depression $D^4$ running along the raised top portion in which the latch bar may be received, as indicated particularly in Figure 6.

Extending generally along the stiffening member D is a latch bar E, curved at its ends as at $E^1$ $E^1$ and provided with inwardly bent portions $E^2$ $E^2$ which may be generally parallel with the main body of the bar, as indicated particularly in Figure 3. At suitable points throughout its length the latch bar E is supported and mounted for rotation in bearing members $E^3$ which are provided with extensions $E^4$ to receive bolts $E^5$ by means of which it is fastened to the channel D. Intermediate its ends the latch bar E is bent as at $E^6$ where it is engaged by the latch operating mechanism, the portion $E^6$ serving as a crank section by means of which the latch bar may be rotated. At some point intermediate the ends of the latch bar and for convenience preferably at its center, is located the rotating or operating mechanism. F is a supporting plate which carries the latch operating mechanism. It may be generally flat and provided at its lower edge with a pair of integral portions bent over to form bearings $F^1$ $F^1$ in which the latch bar E is mounted for rotation. In one form the plate F is supported at its lower edge upon the channel D, being secured thereto by bolts $F^2$ and at its upper end it is supported on a channel member $F^3$ provided with flat portions $F^4$ which are fastened to the hood C. They may be welded or otherwise fastened. The ends of the channel portion $F^3$ are preferably slotted as at $F^5$ to receive bolts $F^6$ by means of which the upper end of the plate F is removably fastened to and supported and spaced by the channel member $F^3$. The channel member $F^3$ and the stiffening member D are both preferably welded to the hood member C so that their fastening requires no projection on the outside of the hood. The bearings for the latch bar are preferably bolted to the channel member so that they may be removed in case of necessity and also for convenience in assembly. The latch operating assembly is also preferably bolted on so that it may be readily removed. One face of the plate F is provided with one or more stops $F^7$ which may be formed integrally with the plate and punched up from it. They serve to limit the movement of the latch operating mechanism as will be described below. The plate F is perforated to permit the shaft of the latch operating mechanism to pass through it. About the perforation a boss $F^8$ is preferably formed integrally with the body of the plate, although it might be separately formed and attached to the plate.

G is a shaft extending through a port $G^1$ in the hood member C and also through the perforation in the plate F and through the boss $F^8$. At its outer end there is fixed to the shaft a handle $G^2$ by means of which it may be rotated. The handle also serves as a means for raising and lowering the hood when it is unlocked. Removably fastened to the inner end of the shaft G is a crank arm $G^3$ which at one end carries a short and preferably inwardly bent portion $G^4$. This portion contacts the stops $F^7$, particularly as indicated in Figure 2, to limit movement of the shaft handle and associated parts. The portion of the crank arm opposite the stop portion $G^4$ extends radially from the shaft and is provided with one or more perforations $G^5$. In one of these there is fastened a part $G^6$ which, at its upper end, may be provided with an enlargement $G^7$ and at its lower end may be rounded or looped as at $G^8$ to engage the bent portion $E^6$ of the latch rod E. Thus when the handle $G^2$ is moved, the shaft to which it is attached is rotated. The crank arm $G^3$ is rotated and the latch rod is rotated so as to be moved into and out of locking or engaging position with the hooks B, $B^1$.

In Figures 9 and 10 a modified form of support for the latch operating mechanism is shown. The other parts of the mechanism are the same as those described above. Instead of the plate F a generally similar plate H is used. At its lower end it is provided with members $H^1$ which are turned to form bearings for the latch bar E which are positioned on either side of the bent portion $E^6$ of the bar E. Stops $H^2$ $H^2$ are formed on one face of the plate H and are contacted by the portion $G^4$ of the crank arm as above described. At its upper edge the plate H is provided with a downwardly bent portion $H^3$ and a flat portion $H^4$ which rests upon the hood C and is secured thereto by a bolt $H^5$.

It will be realized that whereas we have herewith shown and described a practical operative device, nevertheless many changes might be made in the size, shape, number and disposition of parts without departing from the spirit of our invention and we wish, therefore, that our showing be taken as in a sense diagrammatic.

The use and operation of our invention are as follows:

With the parts assembled generally as shown, and as illustrated generally in Figure 1, with the handle $G^2$ in a generally horizontal position, the hood is latched. This position is shown in greater detail in Figures 2 and 8. It will be noticed that with the parts in this position, the bent portions $E^2$ of the latch bar E are raised and engage the hook portions $B^1$. As shown particularly Figure 8 these portions are outwardly and downwardly inclined so that as the hooks $E^2$ of the latch bar engage them, they have a camming action to force the hood inwardly and thus to hold it tightly in position.

If now it is desired to unlatch the hood, the handle $G^2$ is rotated toward a vertical position. This movement of the handle rotates the shaft G and the crank arm $G^3$, moving it from the generally vertical position shown in full lines in Figure 2 toward a generally horizontal position shown in dotted lines in Figure 2. As the crank arm moves toward the position shown, the link $G^6$ is carried from its generally vertical position shown in full lines in Figure 2, toward an inclined position shown in dotted lines in that figure, and as it goes from the first toward the second position, since it engages the portion $E^6$ of the latch rod, it rotates the latch rod downwardly toward the dotted line position of Figure 2, and so rotates the hook portions $E^2$ of the latch rod away from the position shown for example in full lines in Figure 4 toward the position shown in dotted lines in that figure, and thus moves these portions of the latch rod out of engagement with the hooks $B^1$ and thus unlatches the hood and frees it for movement.

The latching or closing movement of the mechanism is the reverse of the unlatching described above. When the parts are unlatched the handle $G^2$ occupies a generally vertical position and the hook portions of the latch rod are swung downwardly into the dotted line positions shown in Figures 2 and 4. Rotary movement of the handle to swing the crank arm $G^3$ upwardly carries with it the link $G^6$ and rotates the latch rod to bring its hook portions $E^2$ into engagement with the fixed hooks $B^1$ and thus to latch the hood in place. The cam faces of the hooks $B^1$ serve to make a progressively tightening engagement between the latch members $E^2$ and the hook members $B^1$.

Where the vibration dampeners $D^3$ $D^4$ are used, the latch rod E is under tension, as the latch bar E lies in the depression $D^4$ of the vibration dampeners and particularly where, because of the size of the hood, a relatively long latch rod or bar is used, the vibration dampeners serve to prevent looseness, slackness, vibration and rattling.

We claim:

1. In a hood latch construction of the type wherein an elongated latch bolt is mounted upon one face of a hood member by spaced bearing members, a hood stiffener adapted to be interposed between the bolt member and the hood member to support the bolt upon the face of the hood, said stiffener comprising a substantially rigid bar of a length approximating that of the bolt member, and a plurality of bolt bearing members carried by the bar in longitudinally spaced relation, there being a bolt bearing adjacent to each end of said bar and another bearing member intermediate said end bearing members, all of said bearing members being axially aligned.

2. In a hood latch construction of the type wherein an elongated latch bolt is mounted upon one face of a hood member by spaced bearing members, a hood stiffener adapted to be interposed between the bolt member and the hood member to support the bolt upon the face of the hood, said stiffener comprising a substantially rigid channel bar of a length approximating that of the bolt member, said bar member including longitudinal side flanges connected by a web portion, a plurality of bolt bearing members, and fastening members by which the bolt bearing members are secured to the bar in longitudinally spaced relation, the web of the bar being apertured to receive said fastening members which latter are provided with heads seated in the space between the longitudinal side flanges of the bar, there being a bolt bearing adjacent to each end of said bar and another bearing member intermediate said end bearing members, all of said bearing members being axially aligned.

3. In a hood latch construction of the type wherein an elongated latch bolt is mounted upon one face of a hood member by spaced bearing members, a hood stiffener adapted to be interposed between the bolt member and the face of the member to support the bolt upon the face of the hood, said stiffener comprising a substantially rigid bar, of a length approximating that of the bolt member, a plurality of bolt bearing members carried by the bar in longitudinally spaced relation, there being a bolt bearing adjacent to each end of said bar and another bearing member intermediate said end bearing members, all of said bearing members being axially aligned, and bolt tensioning means carried by the bar and interposed between one of said end bearings and said intermediate bearing and including a bolt receiving groove slightly offset with respect to said bearing members whereby to maintain a bolt member mounted in said bearings and groove under slight tension.

4. In a hood latch construction of the type wherein an elongated latch bolt is mounted upon one face of a hood member by spaced bearing members, a hood stiffener adapted to be interposed between the bolt member and the hood member to support the bolt upon the face of the hood, said stiffener comprising a substantially rigid bar of a length approximating that of the bolt member, a plurality of bolt bearing members carried by the bar in longitudinally spaced relation, there being a bolt bearing adjacent to each end of said bar and another bearing member intermediate said end bearing members, all of said bearing members being axially aligned, and a plate secured to and extending laterally of the bar, said plate being provided with means for operatively supporting a bolt operating shaft transversely of the axis of the bolt.

5. In a hood latch construction of the type wherein an elongated latch bolt is mounted upon one face of a hood member by spaced bearing members, a hood stiffener adapted to be interposed between the bolt member and the hood member to support the bolt upon the face of the hood, said stiffener comprising a substantially rigid channel bar of a length approximating that of the bolt member, said bar member including longitudinal side flanges connected by a web portion, a plurality of bolt bearing members, fastening members by which the bolt bearing members are secured to the bar in longitudinally spaced relation, the web of the bar being apertured to receive said fastening members, which latter are provided with heads seated in the space between the longitudinal side flanges of the bar, there being a bolt bearing adjacent to each end of said bar and another bearing member intermediate said end bearing members, all of said bearing members being axially aligned, a plate secured to the web portion of the channel bar and extending laterally thereof, said plate being provided with means for supporting a bolt operating shaft transversely of the axis of said bolt, the free end of the plate carrying a side flange extending in the same general direction as the side flanges of the bar, and all of said side flanges terminating in a single plane substantially parallel to the axis of the bolt bearings.

6. In a hood latch construction of the type wherein an elongated latch bolt is mounted upon one face of a hood member by spaced bearing members, a hood stiffener adapted to be interposed between the bolt member and the hood member to support the bolt upon the face of the hood, said stiffener comprising a substantially rigid bar of a length approximating that of the bolt member, a plurality of bolt bearing members carried by the bar in longitudinally spaced relation, there being a bolt bearing adjacent to each end of said bar and another bearing member intermediate said end bearing members, all of said bearing members being axially aligned, and bolt tensioning means carried by the bar and interposed between one of said end bearings and said intermediate bearing, and including a bolt engaging element slightly offset with respect to said bearing members, whereby to maintain a bolt member mounted in said bearings and groove under slight tension.

7. In a hood latch construction of the type wherein an elongated latch bolt is mounted upon one face of a hood member by spaced bearing members, a hood stiffener adapted to be interposed between the bolt member and the hood member to support the bolt upon the face of the hood, said stiffener comprising a substantially rigid bar of a length approximating that of the bolt member, a plurality of bolt bearing members carried by the bar in longitudinally spaced relation, there being a bolt bearing adjacent to each end of said bar and another bearing member intermediate said end bearing members, all of said bearing members being axially aligned, and bolt tensioning means carried by the bar and interposed between one of said end bearings and said intermediate bearing whereby to maintain a bolt member mounted in said bearings and groove under slight tension.

NORTON A. MEARS.
CHAS. A. PERRNON.